United States Patent Office 3,611,528
Patented Oct. 12, 1971

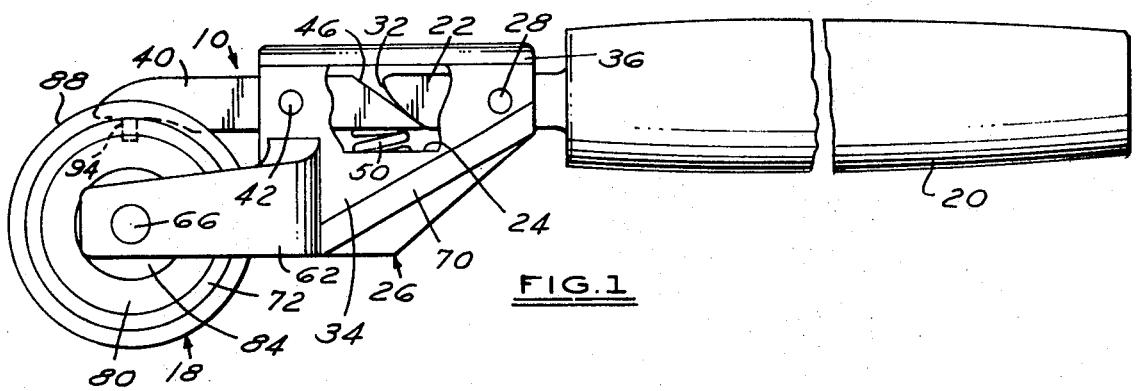
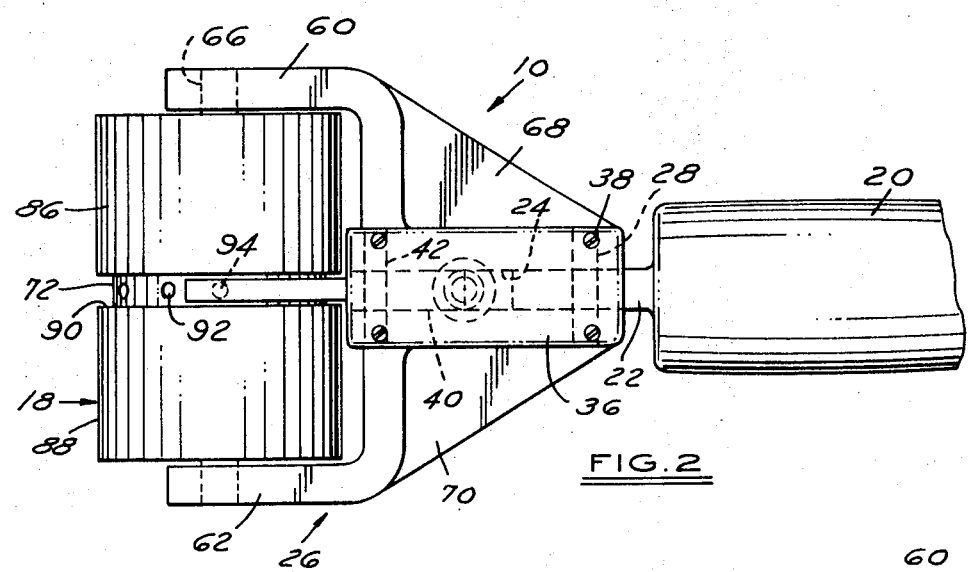
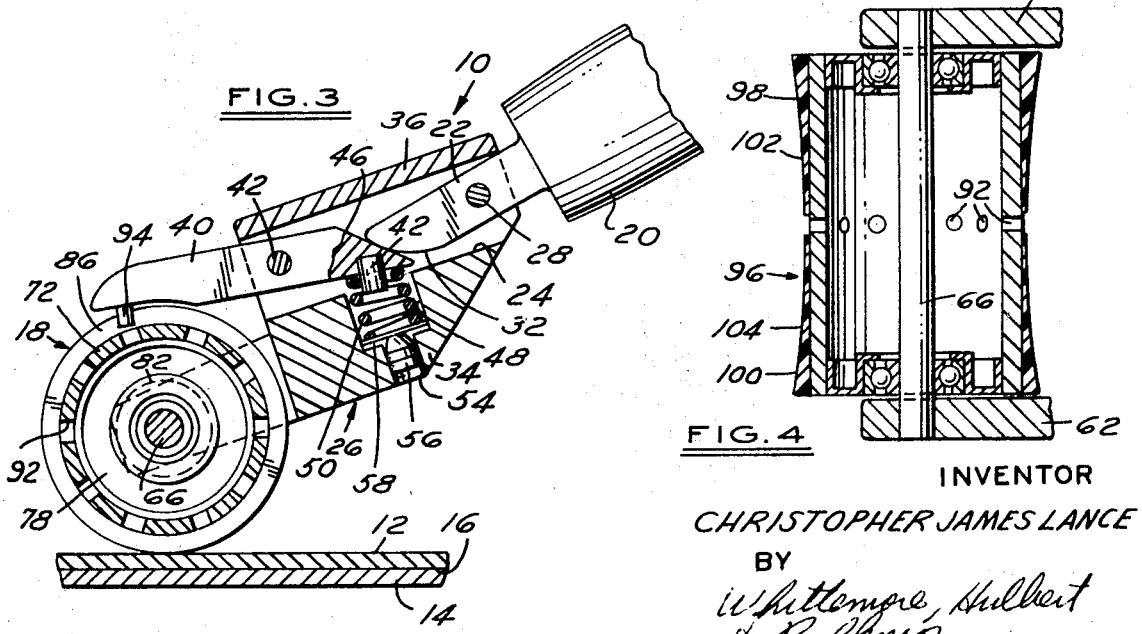
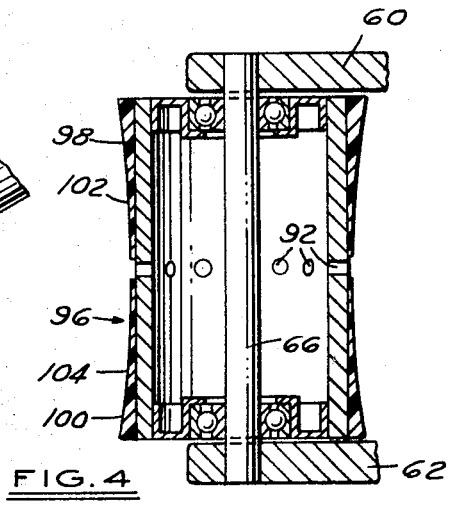

3,611,528
CONTROLLED PRESSURE ROLLER
Christopher James Lance, Royal Oak, Mich., assignor of fractional part interest to Ivan F. Belknap, Detroit, Mich.
Filed May 4, 1970, Ser. No. 34,424
Int. Cl. B05c 1/08
U.S. Cl. 29—110.5                                    8 Claims

ABSTRACT OF THE DISCLOSURE

A controlled pressure roller is provided for applying rolling pressure of a predetermined minimum value onto a surface. The roller structure includes a manually engageable handle and a roller element. Resiliently biased latching means are provided to engage the roller and prevent rotation thereof until sufficient pressure is applied by means of the handle with the roller element in engagement with a surface to cause disengagement of the latching means and permit rolling of the roller element over the surface with the predetermined minimum pressure being applied.

BACKGROUND OF THE INVENTION

Pressure sensitive adhesives have come into widespread use for securing various elements together. Such adhesives have replaced mechanical fastening means in many cases. The advantage of using a pressure sensitive adhesive is economic, it being considerably less expensive to secure parts together by means of an adhesive as opposed to the use of mechanical fasteners.

One application for such pressure sensitive adhesives has been to secure trim strips to automobile bodies. In applying the trim strip, a minimum predetermined pressure must be applied to the trim strip to assure that satisfactory adhesion will result between the trim strip and the auto body. It is desired to have the pressure applied by manual means as opposed to automatic means because of the numerous and varied configurations which such trim strips may take. It would be impractical to provide automatic pressure applicators for this purpose.

The present invention provides a manual roller which may be manipulated by a worker to conform to the configuration of a trim strip as required. The roller includes a latching mechanism which is pressure actuated to release the roller for rotation only when sufficient pressure is applied thereto to assure that proper adhesion will take place.

SUMMARY OF THE INVENTION

The controlled pressure roller is adapted for rolling over a surface while applying a predetermined minimum pressure thereon. The roller comprises a support structure having a manually engageable handle pivotally connected thereto. A roller element is rotatably mounted on the support structure. A locking actuator is pivotally connected to the support structure. The handle includes an actuator which is engageable with the locking actuator. Latching means are provided on the locking actuator. The latching means are engageable with the roller element to prevent rotation thereof. The support structure includes spring means which normally bias the locking actuator into engagement with the roller element. The actuator on the handle engages the locking actuator upon sufficient pressure applied to the handle with the roller element in engagement with a surface to cause pivoting of the locking actuator against the action of the spring means and disengagement of the latching means from the roller element to permit rotation of the roller element along the surface.

In the drawing:

FIG. 1 is a side view of one embodiment of the controller pressure roller of the present invention;

FIG. 2 is a plan view of the forward portion of the roller of FIG. 1;

FIG. 3 is a side view in section of the roller of FIG. 1 illustrating the roller in use; and FIG. 4 is a sectional view of another embodiment of the roller element.

Referring to the embodiment illustrated in FIGS. 1–3, the controlled pressure roller 10 is adapted for use in connection with applying adhesive back trim strip elements 12 to a substrate 14. The adhesive material, which is on the face 16 of the trim strip, is a pressure sensitive adhesive. In order that the trim strip be properly adhered to the substrate, it is necessary to apply a pressure of a predetermined magnitude. In order to be sure that the proper pressure is applied, the roller 10 includes an automatic locking device which prevents rolling of the roller element 18 along the surface of the trim strip 12 unless the applied pressure is at least equal to a predetermined minimum value.

The controlled pressure roller 10 includes a manually engageable handle element 20 which may be fabricated of cast neoprene. A metallic actuator and support element 22 extends axially from the forward end of the handle 20. The actuator 22 is securedly imbedded in the handle 20. As will be noted, the actuator, which is a flat strip element, extends into a slot 24 provided in a support structure 26. The actuator is pivotally secured to the support structure by means of a pin 28. The forward end of the actuator is curved downwardly and rearwardly from the outer tip thereof to form a cam surface 32.

The support structure 26, which may be of cast aluminum, comprises a central block portion 34 in which the slot 24 is formed. A cover 36 is secured to the top of the block portion 34 by means of screws 38. A second actuator 40 extends into the slot 24 from the other end thereof. The actuator 40 is pivotally secured to the support structure by means of a pin 42. The inner end of the actuator 40 has an angular cam surface 46 which extends forwardly and upwardly from the outer end thereof and which engages the cam surface 32 of the actuator 22.

A recess 48 is provided in the block portion 34 beneath the inner end of the actuator 40. A coil spring 50 is received in the recess 48. The spring 50 biases the actuator upwardly to the position illustrated in FIG. 1. A guide pin 52 is provided in the actuator 40. A portion of the pin 52 is received in the center of the spring 50 and serves to maintain the spring in the proper position with respect to the actuator. A threaded opening 54 is provided beneath the recess 48. A screw 56 threadingly engages the opening 54 and bears against a plate 58 provided at the bottom of the recess 48 beneath the spring 50. The screw 56 may be adjusted inwardly or outwardly to vary the biasing force exerted by the spring 50 against the actuator 40.

A pair of L-shaped arms 60, 62 are provided on the forward end of the block 34. The arms 60, 62 define a U-shaped support for the roller element 18. An axle 66 extends through the roller element 64 and is supported in openings provided in the outer ends of the arms 60, 62 to rotatably mount the roller element. A web 68, 70 is provided between the block 34 and arms 60, 62 to provide structural support therefor.

The roller element 18 is cylindrical in form and comprises a metallic sleeve 72 having end caps 78, 80 secured in each end thereof. A ball bearing unit 82, 84 is provided in each end cap to provide anti-friction engagement with the axle 66. A pair of sleeves 86, 88 are received on the metallic sleeve 72. The sleeves 86, 88 do not meet at the center of the roller element, thereby defining a peripheral slot 90 in the center of the roller element. The sleeves 86, 88 are fabricated of a resilient material such as natural or synthetic rubber. Neoprene is a preferred material.

A plurality of spaced apart openings 92 are provided in the metallic sleeve 72 around the peripheral portion thereof defined by the slot 90. The actuator 40 has a radially inwardly extending pin 94 on the underside of the outer end thereof. The pin 94 is receivable in any one of the openings 92.

Operation of the roller 10 may now be understood. The roller, in its normal state, assumes the configuration illustrated in FIG. 1. As will be noted, the spring 50 biases the actuator 40 upwardly as viewed in FIG. 1. Engagement of the cam surfaces 32, 46, causes the forward end of the actuator 40 to be moved radially inwardly of the roller element 18 resulting in engagement of the pin 94 with one of the openings 92. This prevents the roller element from rotating on the axle 66.

When the roller 10 is utilized to adhere trim element 12 to the substrate 14, as shown in FIG. 3, downward pressure is applied to the handle 20 causing compression of the spring 50 with resultant cocking of the actuator 40 and movement of the forward end thereof radially outwardly from the roller element 18. The pin 94 is pulled out of the opening 92 thus leaving the roller element 18 free to rotate about the axle 66. The roller 10 may now be rolled along the strip 12 causing the proper pressure to be applied thereto for satisfactory adhesion to the substrate 14. If, at any time, the pressure applied on the handle 20 does not equal the prescribed minimum pressure, the actuator 40 will move back towards the position illustrated in FIG. 1 resulting in the pin 94 again engaging an opening 92 and preventing rotation of the roller element 64. The operator of the device will then be aware that the proper pressure is not being applied because the roller will tend to grab. He will then know that he should increase the pressure on the handle to result in the proper pressure being applied by the roller element against the trim strip. The applied pressure may be adjusted as needed by means of the adjusting screw 56.

FIG. 4 illustrates a modified roller element 96. The roller element 96 differs from the roller element 18 in that the resilient sleeve elements 98, 100 have an outer surface 102, 104 which is dished to form an overall concave surface. Such a surface is adapted to match the contour of a trim strip having an outer convex surface. It will be appreciated that the shape of the roller element surface may be varied to match the configuration of variously shaped trim strips.

What I claim as my invention is:

1. A controlled pressure roller for rolling over a surface while applying a predetermined minimum pressure thereon, comprising a manually engageable support structure, a roller element rotatably mounted on the support structure, a locking structure carried on the support structure, said support structure including resilient means normally biasing the locking structure into engagement with the roller element to prevent rotation thereof, and pressure actuated release structure on said support structure operatively connected to the locking structure to, upon sufficient pressure applied to the support structure with the roller element in engagement with a surface, cause release of the locking structure from the roller element and permit rotation of the roller element along the surface.

2. A controlled pressure roller for rolling over a surface while applying a predetermined minimum pressure thereon, comprising a support structure, a manually engageable handle pivotally connected to the support structure, a roller element rotatably mounted on the support structure, a locking actuator pivotally connected to the support structure, said handle including an actuator engageable with the locking actuator, latching means on the locking actuator engageable with the roller element to prevent rotation thereof, spring means in the support structure normally biasing the locking actuator into engagement with the roller element, the actuator on the handle engaging the locking actuator upon sufficient pressure applied to the handle with the roller element in engagement with the surface to cause pivoting of the locking actuator against the action of the spring means and disengagement of the latching means and roller element to permit rotation of the roller element along the surface.

3. A controlled pressure roller as defined in claim 2, further characterized in that said support structure includes a slot receiving the locking actuator at one end and the actuator on the handle at the other end, said actuators being pivotally mounted intermediate the ends thereof, said actuators having mutually engageable cam surfaces on the inner ends thereof, said spring means being positioned beneath the locking actuator and being compressed thereby upon application of sufficient force between the cam surfaces.

4. A controlled pressure roller as defind in claim 3, further characterized in the provision of adjusting means to vary the force exerted by the spring means.

5. A controlled pressure roller as defined in claim 3, further characterized in that said locking actuator has a portion extending exteriorly of the support structure and over the roller element, said latching means comprising a catch extending from the locking actuator at a point over the roller element, said roller element having peripherally spaced apart opening means in alignment with the catch for reception of the catch in locking engagement therewith.

6. A controlled pressure roller as defined in claim 5, further characterized in that said pressure roller comprises a cylindrical element having a peripheral slot intermediate the ends thereof in alignment with the locking actuator to receive the locking actuator, the surface portions of the pressure roller on either side of the peripheral slot being fabricated of resilient material.

7. A controlled pressure roller as defined in claim 6, further characterized in that the resilient surface portions define a substantially flat rolling surface.

8. A controlled pressure roller as defined in claim 6, further characterized in that said resilient surface portions define a concave rolling surface.

References Cited

UNITED STATES PATENTS

| 1,465,177 | 8/1923 | Richter | 29—110.5 |
| 2,881,461 | 4/1959 | Parker | 15—230.11 |
| 3,131,104 | 4/1964 | Korn | 29—110.5 UX |
| 3,340,131 | 9/1967 | Leibow | 156—579 |
| 3,386,124 | 6/1968 | Feine | 15—230.11 |
| 3,127,299 | 3/1964 | Hecht | 156—579 |

FOREIGN PATENTS

| 44,260 | 1/1909 | Switzerland | 15—230.11 |

ALFRED R. GUEST, Primary Examiner

U.S. Cl. X.R.

156—579